United States Patent
Kyusojin et al.

(10) Patent No.: US 7,584,307 B2
(45) Date of Patent: Sep. 1, 2009

(54) DIRECT MEMORY ACCESS DMA WITH POSITIONAL INFORMATION AND DELAY TIME

(75) Inventors: Hiroshi Kyusojin, Tokyo (JP); Hideki Matsumoto, Kanagawa (JP); Masato Kajimoto, Chiba (JP); Chiaki Yamana, Kanagawa (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 11/392,584

(22) Filed: Mar. 30, 2006

(65) Prior Publication Data

US 2006/0242334 A1 Oct. 26, 2006

(30) Foreign Application Priority Data

Apr. 13, 2005 (JP) ............................. P2005-115370

(51) Int. Cl.
*G06F 3/00* (2006.01)
(52) U.S. Cl. ........................................... 710/22; 710/40
(58) Field of Classification Search .................. 710/22, 710/40
See application file for complete search history.

(56) References Cited

U.S. PATENT DOCUMENTS 5,794,073 A * 8/1998 Ramakrishnan et al. ....... 710/40
5,822,618 A * 10/1998 Ecclesine ...................... 710/57
5,887,187 A * 3/1999 Rostoker et al. .............. 712/29

FOREIGN PATENT DOCUMENTS

JP 2000-298640 10/2000

* cited by examiner

*Primary Examiner*—Henry W. H. Tsai
*Assistant Examiner*—Juanito C Borromeo
(74) *Attorney, Agent, or Firm*—Finnegan, Henderson, Farabow, Garrett & Dunner, L.L.P.

(57) ABSTRACT

An information processor includes: generating section generating a descriptor, the descriptor including positional information, which indicates a packet-by-packet recording position of the data in the memory, and delay time relating to packet-by-packet processing; an extracting section acquiring the descriptor generated by the generating section and extracting the positional information and the delay time from the acquired descriptor; an DMA section reading packet-by-packet data from the memory on the basis of the extracted positional information; and a delaying section delaying processing of at least one of the extracting section and the DMA section by the delay time that has been extracted by the extracting section.

6 Claims, 8 Drawing Sheets

(PRIOR ART)

DIRECT MEMORY ACCESS DMA WITH POSITIONAL INFORMATION AND DELAY TIME

CROSS REFERENCES TO RELATED APPLICATIONS

The present invention contains subject matter related to Japanese Patent Application JP 2005-115370 filed in the Japanese Patent Office on Apr. 13, 2005, the entire contents of which are incorporated herein by reference.

BACKGROUND OF THE INVENTION

1. Field of the Invention

The present invention relates to an information processor and an information processing method, and more specifically to an information processor and an information processing method that are suitably used for reading data stored in a memory by DMA (Direct Memory Access) and transmitting the read data via a network.

2. Description of the Related Art

A system is considered in which data is transmitted from a transmitter to a receiver via a network. FIG. 1 shows an example of the configuration of the system.

A transmitter 1 includes a CPU 11 for controlling the entire transmitter 1 by executing a predetermined program, a memory 13 connected to the CPU 11 via a data bus 12, a memory controller 14, and a network card 15. The memory 13 stores data to be transmitted to a receiver 3 (hereinafter, referred to as the "transmit data"). Normally, in order that the data does not unnecessarily occupy the CPU 11, the data is read by DMA (Direct Memory Access) from the memory 13 and moved to the network card 15 before being transmitted from the network card 15 to the receiver 3 via a network 2.

Referring to the flowchart of FIG. 2, description will be made of the operation of performing DMA on the network card 15 with respect to the transmit data recorded in the memory 13. In step S1, the CPU 11 writes packet-by-packet information on the transmit data into each descriptor of a descriptor table provided in the memory 13.

FIG. 3 shows an example of the descriptor table. The descriptor table includes a plurality of descriptors #0 through #n recorded in a continuous region of the memory 13. FIG. 4 shows the data structure of each descriptor. Described in the descriptor are "address(high)" indicating the higher 32 bits, "address(low)" indicating the lower 32 bits, "reserved" indicating unused 16 bits, and "length" consisting of 16 bits indicating the packet length, of a recording start address in the memory 13 of the corresponding packet.

Returning to FIG. 2, in step S2, the CPU 11 notifies the network card 15 of the numbers of descriptors that have become usable (that is, descriptors into which the packet-by-packet information has been written through the processing in step S1).

In response to the above notification, in step S3, the network card 15 sequentially reads usable descriptors one by one from the memory 13. Then, in step S4, the network card 15 notifies the memory controller 14 of the recording start address and the packet length that are described in each descriptor. In response to this notification, the memory controller 14 causes data stored in the memory 13 which has the above recording start address at the leading end and the above packet length to be transferred by DMA from the memory 13 to the network card 15. The network card 15 transmits the DMA-transferred packet to the receiver 3 via the network 2.

Through the processing of steps S3 and S4, one packet of the transmit data has been moved to the network card 15 and transmitted to the receiver 3.

In step S5, the network card 15 makes a determination as to whether there are descriptors that have not yet been read among the usable descriptors. If it is determined that there are descriptors that have not yet been read, the processing returns to step S3, and the subsequent processing is repeated. If it is determined in step S5 that there are no descriptors that have not been read, it means that all the packets forming the transmit data have been moved to the network card 15 and transmitted to the receiver 3. The processing thus advances to step S6. In step S6, the network card 15 notifies the CPU 11 of the end of DMA. In step S7, the CPU 11 frees up the space on the memory 13 in which the transmit data was recorded. The foregoing completes the description of the operation of performing a DMA transfer from the memory 13 to the network card 15.

Note that DMA transfer is described in, for example, Japanese Unexamined Patent Application Publication No. 2000-298640.

SUMMARY OF THE INVENTION

As described above, the DMA transfer is started by the CPU 11 notifying the network card 15 of the numbers of descriptors that have become usable. In this regard, the granularity (the time interval for controlling the operation timing) of the processing by the CPU 11, which operates in accordance with software, is large as compared with that of the network card 15. The granularity of the software processing thus creates a bottleneck, making it difficult to fully exploit the inherent performance (the fineness of granularity of processing) potential of the network card 15. Accordingly, for example, it has been difficult to adjust the transmission interval for transmitting a packet from the network card 15 via the network 2 with the precision commensurate with the inherent performance of the network card 15.

It is desirable to adjust with high precision the transmission interval at the time of reading data stored in the memory and transmitting it by DMA.

An information processor according to an embodiment of the present invention includes: generating means for generating a descriptor, the descriptor including positional information, which indicates a packet-by-packet recording position of the data in the memory, and delay time relating to packet-by-packet processing; extracting means for acquiring the descriptor generated by the generating means and extracting the positional information and the delay time from the acquired descriptor; DMA means for reading packet-by-packet data from the memory on the basis of the extracted positional information; and delaying means for delaying processing of at least one of the extracting means and the DMA means by the delay time that has been extracted by the extracting means.

The generating means can be realized by software, and the delaying means can be realized by hardware.

The extracting means can be adapted to acquire the descriptors generated by the generating means one by one.

The extracting means can be adapted to collectively acquire a plurality of the descriptors generated by the generating means.

An information processing method according to an embodiment of the present invention includes the steps of: generating a descriptor including positional information, which indicates a packet-by-packet recording position of the data in the memory, and delay time relating to packet-bypacket processing; acquiring the descriptor generated by processing of the generating step; extracting the delay time from the descriptor acquired by processing of the acquiring step; extracting the positional information from the descriptor acquired by processing of the acquiring step, and reading packet-by-packet data from the memory on the basis of the extracted positional information; and delaying processing of at least one of the acquiring step and the DMA step by the delay time that has been extracted by processing of the extracting step.

According to the present invention, the descriptor including the positional information, which indicates the packet-by-packet recording position of the data in the memory, and the delay time relating to the packet-by-packet processing is generated, the generated descriptor is acquired, the positional information and the delay time are extracted from the acquired descriptor, and the packet-by-packet data is read by DMA on the basis of the extracted positional information. Then, at least one of the extracting processing and the DMA processing is delayed by the delay time that has been extracted.

According to the present invention, the transmission interval at the time of reading data stored in the memory by DMA and transmitting it can be adjusted with high precision.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment(s) supporting the claimed invention are described in this specification. Thus, even if an element in the following embodiment(s) is not described as relating to a certain feature of the present invention, this does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment(s) are described in the claims. That is, the description does not deny the existence of aspects of the present invention that are described in the embodiment(s) but not claimed in the invention of this application, i.e., the existence of aspects of the present invention that in future may be claimed by a divisional application, or that may be additionally claimed through amendments.

Figure 6:
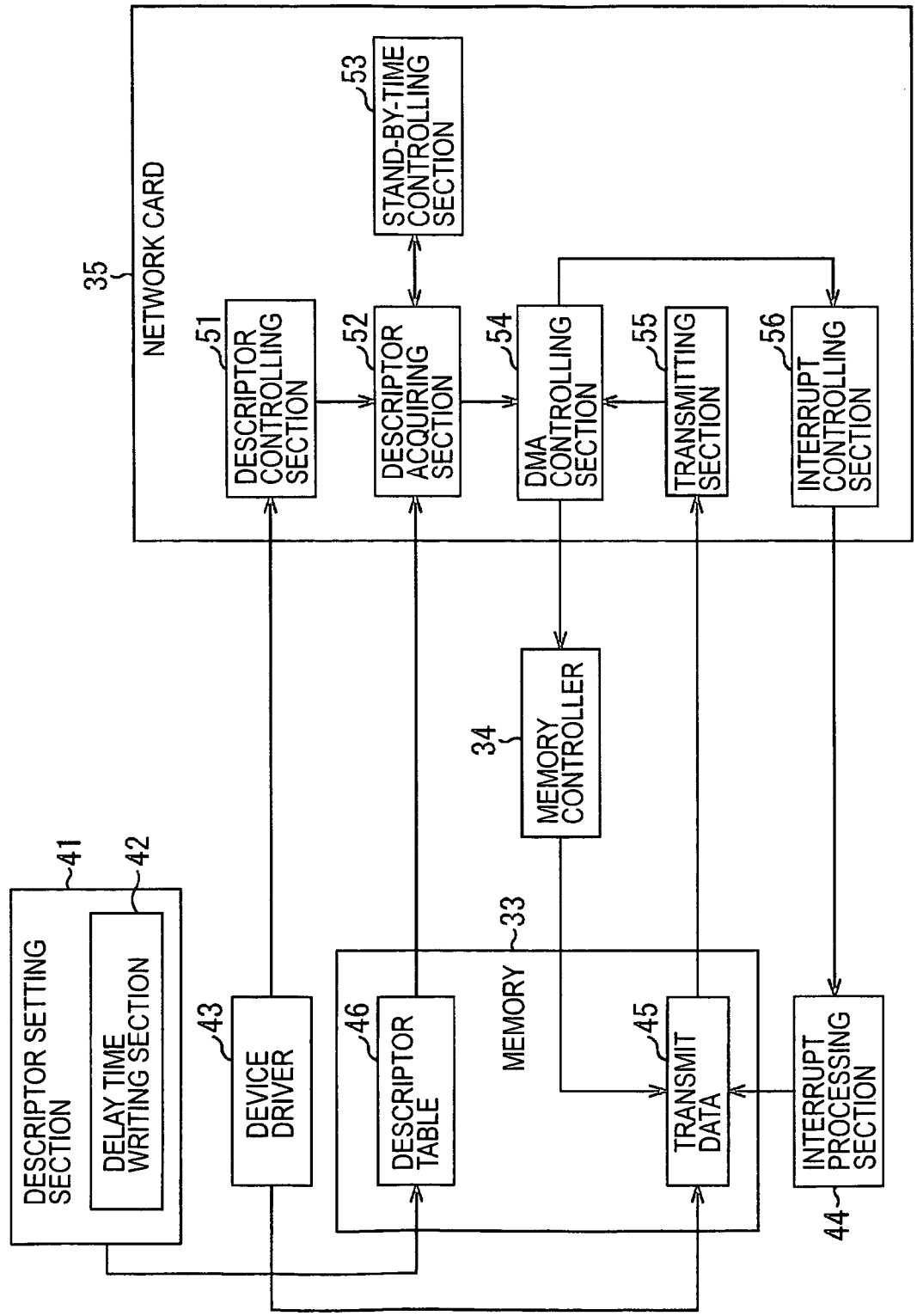
FIG. 6 is a block diagram showing an example of the configuration of functional blocks realized by a CPU shown in FIG. 5 and of a network card.

An information processor (for example, a transmitter 30 shown in FIG. 5) according to an embodiment of the present invention includes:

generating means (for example, a descriptor setting section 41 shown in FIG. 6) for generating a descriptor, the descriptor including positional information, which indicates a packet-by-packet recording position of the data recorded in the memory, and delay time relating to packet-by-packet processing;

extracting means (for example, a descriptor acquiring section 52 shown in FIG. 6) for acquiring the descriptor generated by the generating means and extracting the positional information and the delay time from the acquired descriptor;

DMA means (for example, an DMA controlling section 54 shown in FIG. 6) for reading packet-by-packet data from the memory on the basis of the extracted positional information; and delaying means (for example, a stand-by-time controlling section 53 shown in FIG. 6) for delaying processing of at least one of the extracting means and the DMA means by the delay time that has been extracted by the extracting means.

Figure 8:
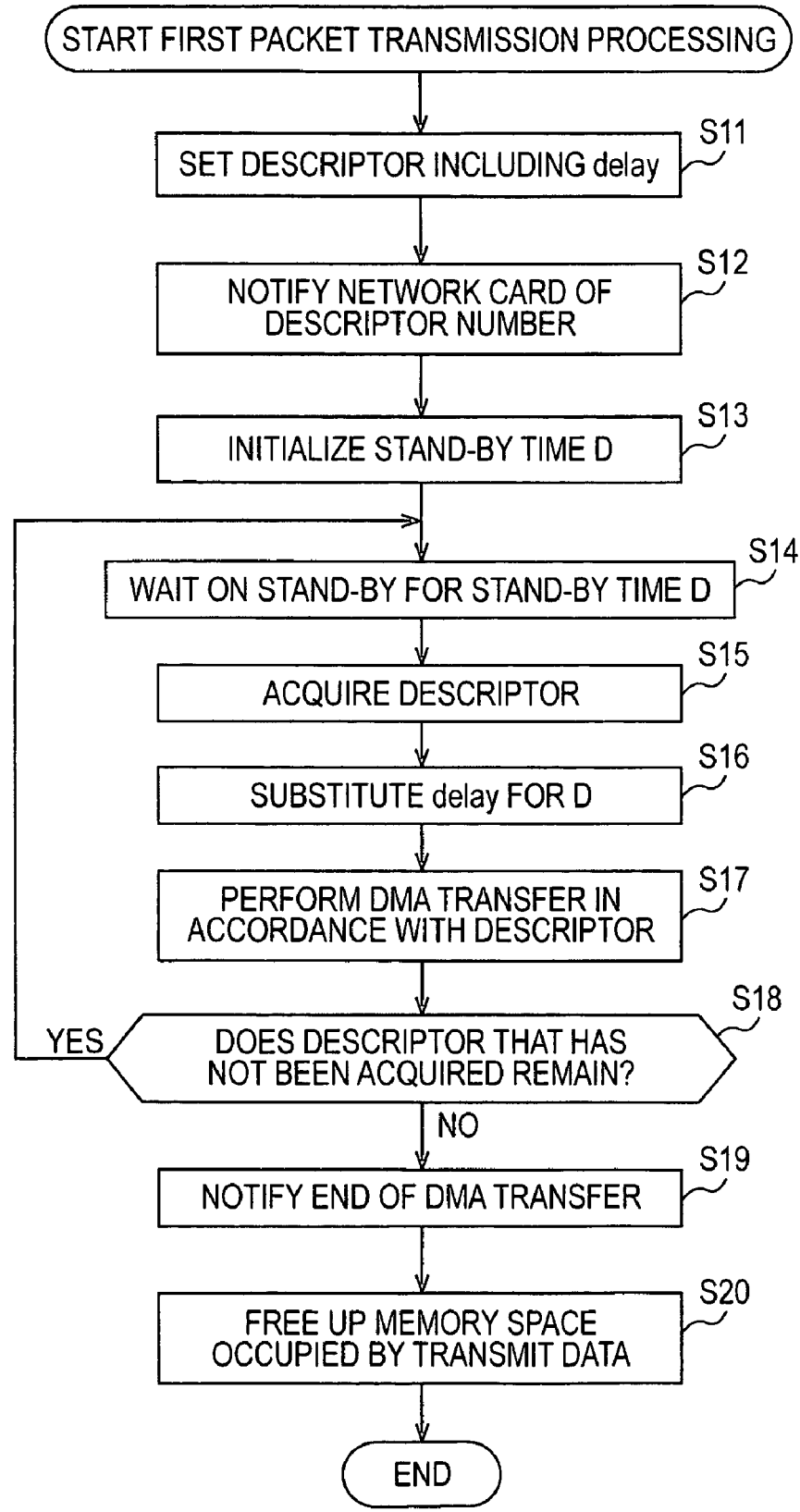
FIG. 8 is a flowchart illustrating first packet transmission processing by a transmitter shown in FIG. 5.

An information processing method according to an embodiment of the present invention includes the steps of:

generating a descriptor including positional information, which indicates a packet-by-packet recording position of the data in the memory, and delay time relating to packet-by-packet processing (for example, step S11 shown in FIG. 8);

acquiring the descriptor generated by processing of the generating step (for example, step S15 shown in FIG. 8);

extracting the delay time from the descriptor acquired by processing of the acquiring step (for example, step S16 shown in FIG. 8);

extracting the positional information from the descriptor acquired by processing of the acquiring step, and reading packet-by-packet data from the memory on the basis of the extracted positional information (for example, step S17 shown in FIG. 8); and delaying processing of at least one of the acquiring step and the DMA step by the delay time that has been extracted by processing of the extracting step (for example, step S14 shown in FIG. 8).

Specific embodiments of the present invention will be described below in detail with reference to the drawings.

Figure 5:
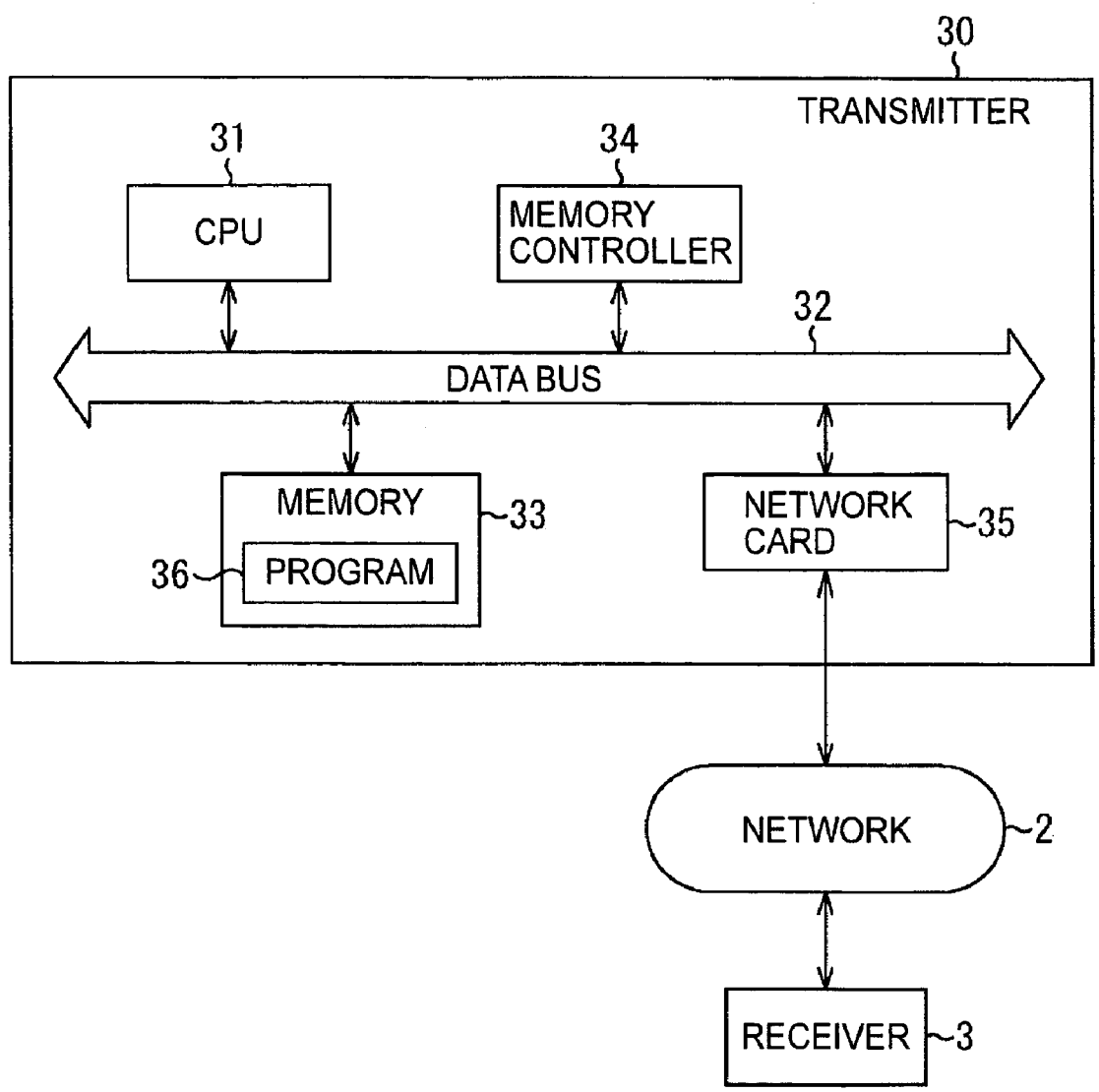
FIG. 5 is a block diagram showing an example of the configuration of a transmitter according to an embodiment of the present invention.

FIG. 5 shows an example of the configuration of a transmitter according to an embodiment of the present invention. A transmitter 30 transmits transmit data, which is recorded (or accumulated) in a built-in memory 33, to a receiver 3 via a network 2 while controlling the transmission rate.

The transmitter 30 includes a CPU 31 for realizing the functional blocks (a descriptor setting section 41, a device driver 43, and an interrupt processing section 44) shown in FIG. 6 by executing a program 36 recorded in the memory 33, the memory 33 connected to the CPU 31 via a data bus 32, and a network card 35.

The program 36 (including the device driver program for controlling the network card 35) executed by the CPU 31 is recorded in the memory 33. Further, the memory 33 accumulates transmit data 45 (FIG. 6) and is provided with a descriptor table 46 (FIG. 6) including a plurality of descriptors.

In accordance with a recording start address "address" and a packet length "length" the memory controller 34 is notified of by the network card 35, the memory controller 34 causes the transmit data 45 recorded in the memory 33 to be transferred to the network card 35 on the packet-by-packet basis.

The network card 35 reads the descriptors written into the memory 33 by the CPU 31, and controls the memory controller 34 in accordance with the read descriptors, thus acquiring packet-by-packet transmit data 45 through DMA transfer and transmitting it to the receiver 3 via the network 2.

FIG. 6 shows a detailed example configuration of the functional blocks realized by the CPU 31 executing the program 36, and of the network card 35.

The descriptor setting section 41, the device driver 43, and the interrupt processing section 44 as functional blocks are realized by the execution of the program 36 by the CPU 31.

Figure 1:
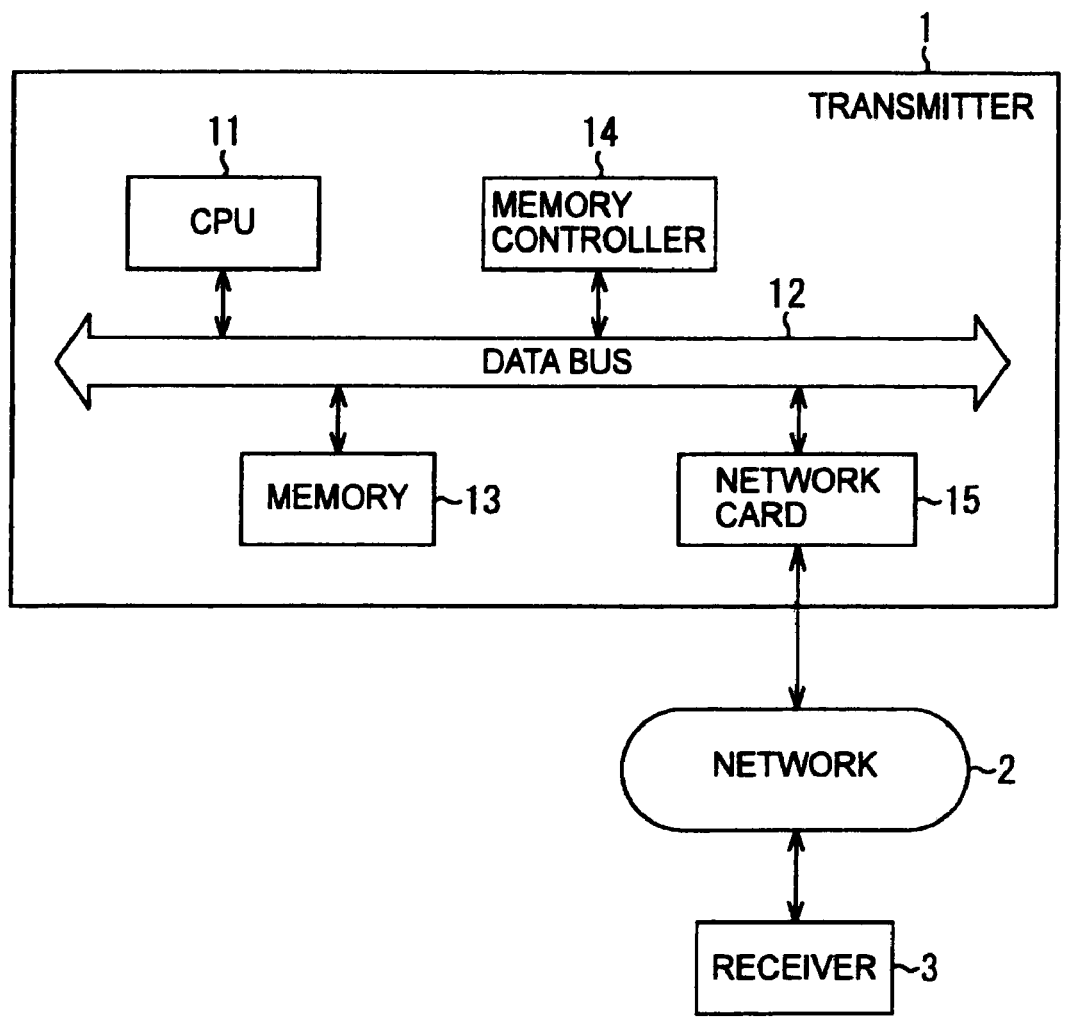
FIG. 1 is a diagram showing an example of a system for transmitting/receiving data via a network.
Figure 2:
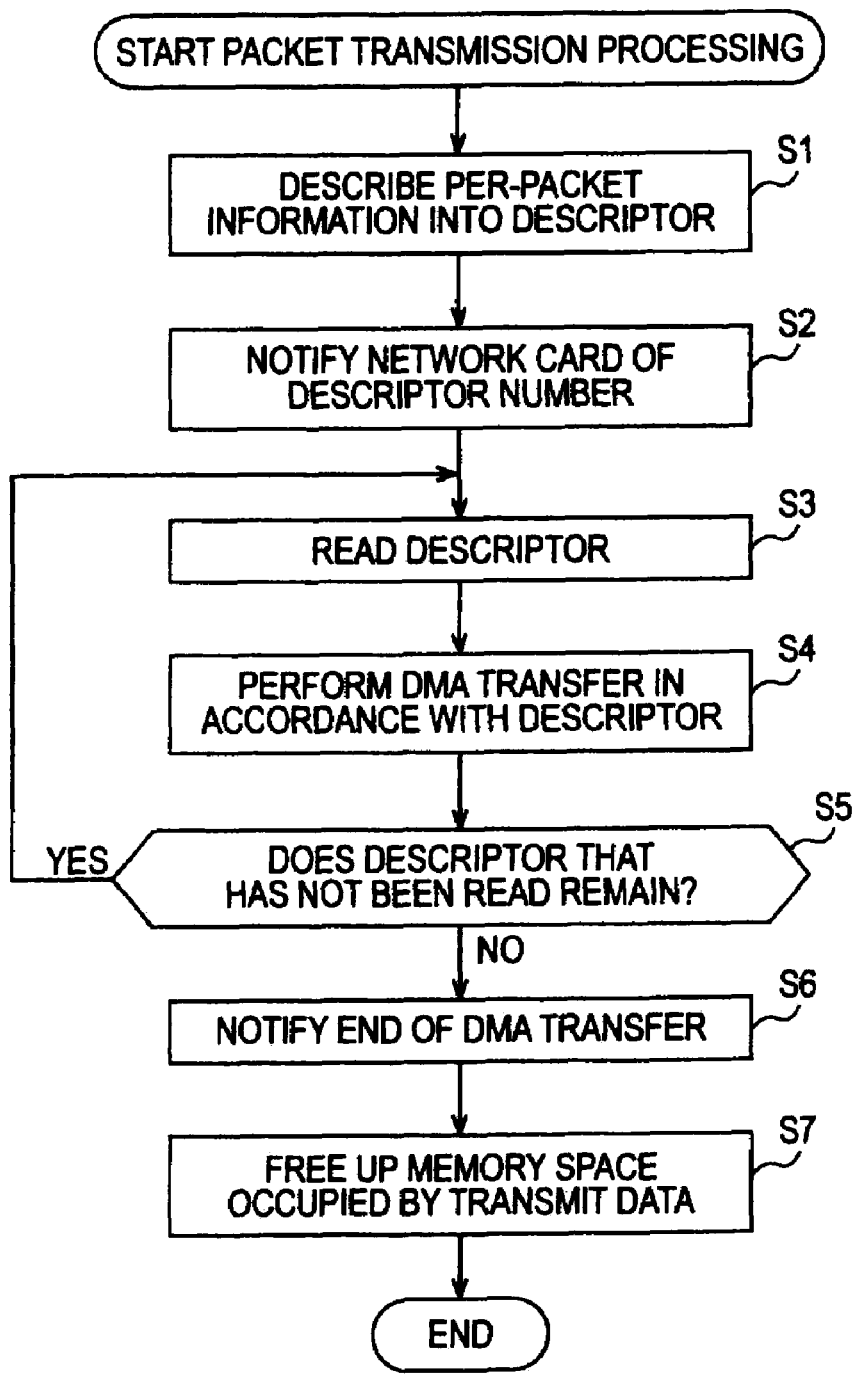
FIG. 2 is a flowchart for explaining the operation by a transmitter shown in FIG. 1.
Figure 3:
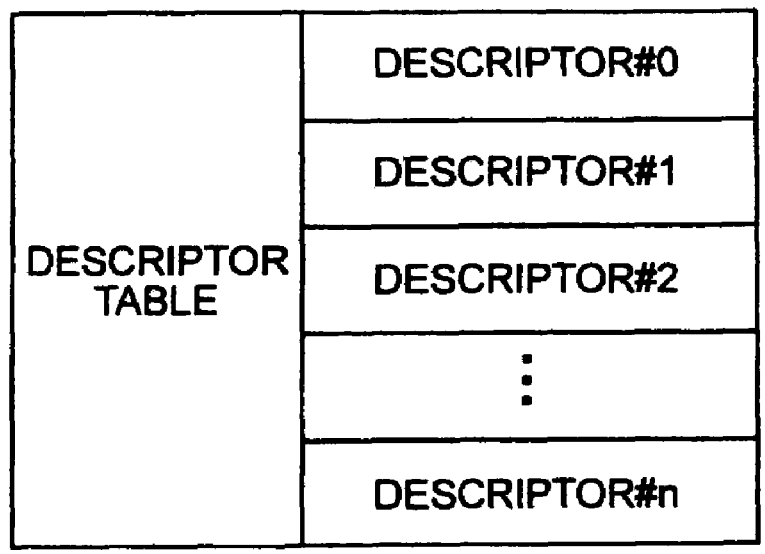
FIG. 3 is a diagram showing an example of a descriptor table including a plurality of descriptors.
Figure 4:
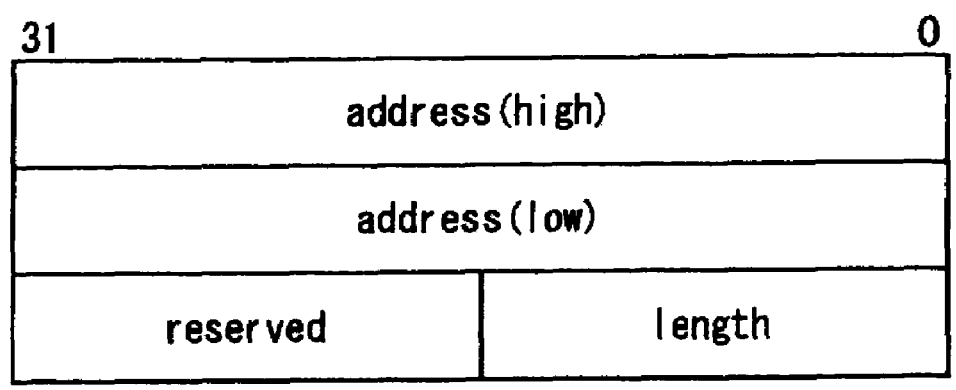
FIG. 4 is a diagram showing the data structure of a descriptor used for DMA.

The descriptor setting section 41 writes packet-by-packet information on the transmit data 45 into each descriptor of the descriptor table 46 provided in the memory 33. Note that as shown in FIG. 3, the descriptor table 46 includes a plurality of sequentially arranged descriptors.

Figure 7:
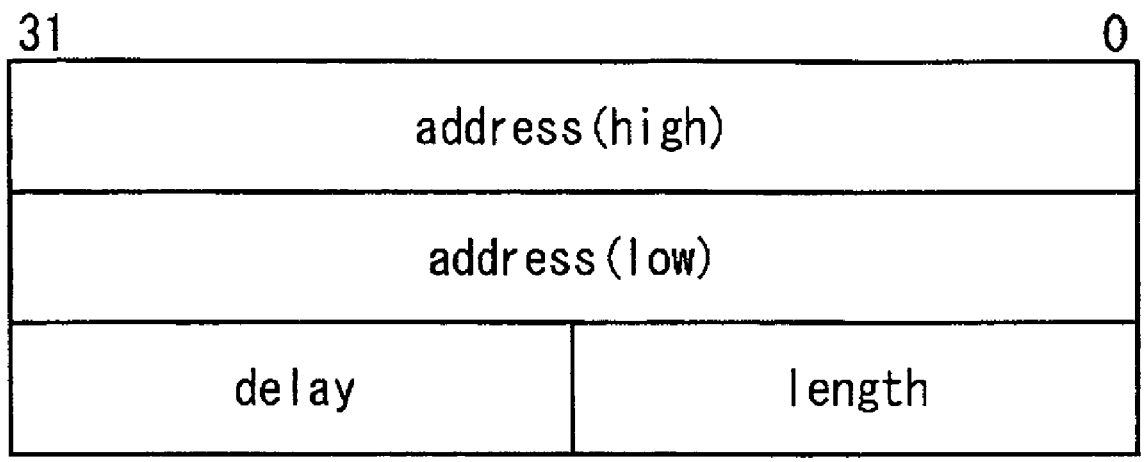
FIG. 7 is a diagram showing the data structure of a descriptor set by a descriptor setting section shown in FIG. 6.

FIG. 7 shows the data structure of the descriptor written by the descriptor setting section 41. Like the descriptor shown in FIG. 3, "address(high)" indicating the higher 32 bits, "address(low)" indicating the lower 32 bits, and "length" consisting of 16 bits indicating the packet length, of the recording start address in the memory 33 of the corresponding packet are included in the descriptor. Further, "delay" indicating the delay time for adjusting the interval of packet DMA transfer is included in the portion of "reserved" consisting of 16 bits which is unused in the descriptor shown in FIG. 3. The "delay" is written by a delay time writing section 42 of the descriptor setting section 41. Note that the descriptor table 46 may be provided not in the memory 33 but in, for example, a storage section (not shown) provided to the network card 35.

The device driver 43 notifies a descriptor controlling section 51 of the network card 35 of the number of the descriptor that has become usable, that is, the number of the descriptor that has been set by the descriptor setting section 41.

The interrupt processing section 44 performs predetermined interrupt processing (the processing of freeing up the space of the memory 3 occupied by the transmit data 45, or the like) when notified of the end of DMA by the interrupt controlling section 56 of the network card 35.

On the other hand, the network control card 35 includes the descriptor controlling section 51, a descriptor acquiring section 52, a stand-by-time controlling section 53, a DMA controlling section 54, a transmitting section 55, and the interrupt controlling section 56.

The descriptor controlling section 51 stores the number of the usable descriptor notified by the device driver 43 in a built-in register. The descriptor acquiring section 52 acquires the usable descriptor from the descriptor table 46 provided in the memory 33 on the basis of the number of the usable descriptor stored in the descriptor controlling section 51, notifies the DMA controlling section 54 of the recording start address "address" and the packet length "length" that are included in the descriptor, and notifies the stand-by-time controlling section 53 of the delay time "delay".

The stand-by-time controlling section 53 retains stand-by time D, and each time the stand-by-time controlling section 53 is notified of the delay time "delay" by the descriptor acquiring section 52, the stand-by-time controlling section 53 updates the stand-by time D using the notified delay time "delay". Further, the stand-by-time controlling section 53 delays the start of operation of the descriptor acquiring section 52 by the stand-by time D.

The DMA controlling section 54 notifies the memory controller 34 of the recording start address "address" and the packet length "length" received from the descriptor acquiring section 52, and requests execution of DMA. Further, when it receives a notification indicating nonexistence of a usable descriptor from the descriptor acquiring section 52 and receives from the DMA controlling section 54 a notification indicating the end of DMA based on processing of the last usable descriptor, the DMA controlling section 54 notifies the interrupt controlling section 56 of the end of DMA.

The transmitting section 55 transmits the packet-by-packet transmit data 45, which is transferred by DMA from the memory 45 in response to control performed by the memory controller 34, to the receiver 3 via the network 2. Upon receiving from the DMA controlling section 54 a notification indicating the end of DMA, the interrupt controlling section 56 notifies the interrupt processing section 44 of the end of DMA.

The operation performed by the transmitter 30 will be described. The transmitter 30 executes first or second packet transmission processing as described below.

First, the first packet transmission processing will now be described with reference to the flowchart of FIG. 8. Note that the transmit data 45 is accumulated in the memory 33.

In step S11, the descriptor setting section 41 writes packet-by-packet information (including "delay") on the transmit data 45 into each descriptor of the descriptor table 46 provided in the memory 33. In step S12, the device driver 43 notifies the descriptor controlling section 51 of the network card 35 of the number of a descriptor that has become usable, that is, the number of a descriptor set by the descriptor setting section 41 in the processing of step S11. The descriptor controlling section 51 stores the notified descriptor number in the built-in register. In step S13, the stand-by-time controlling section 53 initializes the retained stand-by time D to zero.

In step S14, the stand-by-time controlling section 53 waits on standby for the retained stand-by time D. The processing from step S15 onward is thus delayed by the stand-by time D. In the present case, since the stand-by time D=0, the processing immediately advances to step S15.

In step S15, the descriptor acquiring section 52 acquires from the descriptor table 46 provided in the memory 33 one descriptor corresponding to the number stored in the register of the descriptor controlling section 51. In step S16, the descriptor acquiring section 52 notifies the stand-by-time controlling section 53 of the delay time "delay" described in the acquired descriptor. The stand-by-time controlling section 53 substitutes the notified delay time "delay" for the retained stand-by time D.

In step S17, the descriptor acquiring section 52 notifies the DMA controlling section 54 of the recording start address "address" and the packet length "length" that are described in the acquired descriptor. The DMA controlling section 54 notifies the memory controller 34 of the notified start address "address" and packet length "length" and requests execution of DMA. In response to this, the memory controller 34 transfers data of the packet length "length" from the notified recording start address "address" of the memory 33 to the transmitting section 55 by DMA. The transmitting section 55 transmits the DMA-transferred packet-by-packet transmit data 45 to the receiver 3 via the network 2.

In step S18, the descriptor acquiring section 52 makes a determination as to whether or not, of the descriptors corresponding to the numbers stored in the register of the descriptor controlling section 51, there remain descriptors that have not been acquired. If it is determined that there remain descriptors that have not been acquired, the processing returns to step S14, and the subsequent processing is repeated. Note that in the processing of step S14 from the second time onward, since the delay time "delay" has been substituted for the stand-by time D in the processing of step S16 the previous time, the stand-by time is actually provided. Thus, the repetition interval for the processing from steps S14 through S18 including step S14 depends on the delay time "delay" described in the descriptor.

When it is determined in step S18 that there remains no descriptor that has not been acquired, the processing advances to step S19. In step S19, the DMA controlling section 54 gives a notification indicating the end of DMA to the interrupt controlling section 56. In response to this notification, the interrupt controlling section 56 notifies the interrupt processing section 44 of the end of DMA. In step S20, in response to this notification, the interrupt processing section 44 performs predetermined interrupt processing (processing of freeing up the space of the memory 3 occupied by the transmit data 45, or the like). Note that in actuality, the predetermined interrupt processing is performed when a program for realizing the interrupt processing section 44 is started in response to the notification from the interrupt controlling section 56. The foregoing completes the description of the first packet transmission processing by the transmitter 30.

According to the first packet transmission processing, the descriptor set in step S11 is acquired in step S14, and the stand-by time D is set on the basis of this descriptor (step S16). As a result, the repetition interval for the processing from steps S14 through S18 (that is, the repetition interval for the processing of acquiring the descriptor, transferring the packet by DMA on the basis of the acquired descriptor, and transmitting it via the network 2) corresponds to the delay time D for which the delay time "delay" described in the descriptor is substituted. The delay time D is controlled by the stand-by-time controlling section 53. Herein, the stand-by-time controlling section 53 is a circuit formed on the network card 35 as hardware. Accordingly, it is possible to control the repetition interval for the processing from the steps S14 through S18 with high precision. It is thus possible to achieve stable transmission rate for the transmit data to prevent the transmit data from being transmitted in a burst-like manner, thereby realizing so-called traffic shaping.

Figure 9:
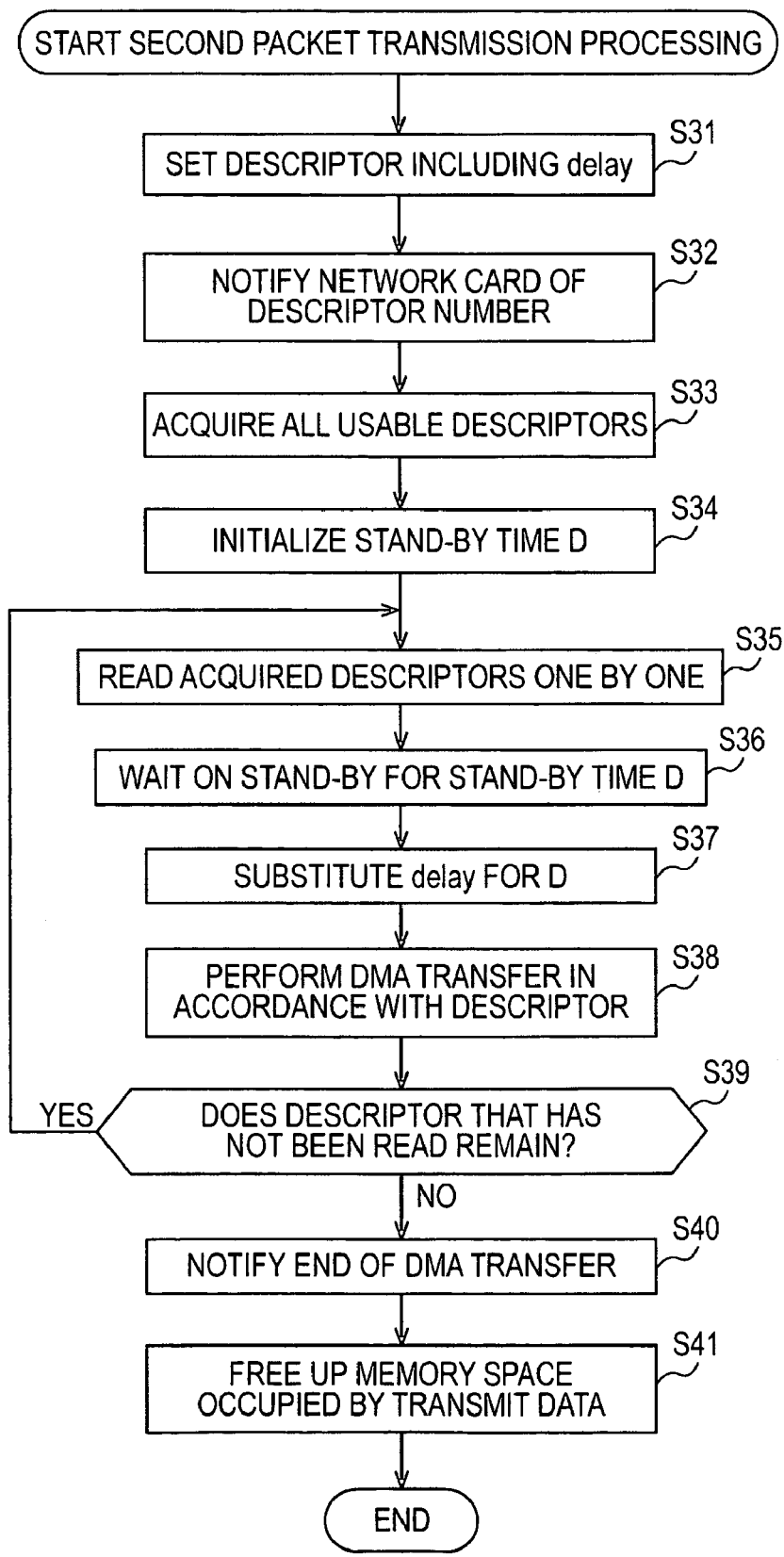
FIG. 9 is a flowchart illustrating second packet transmission processing by the transmitter shown in FIG. 5.

Next, the second packet transmission processing will be described with reference to the flowchart of FIG. 9. Note that the transmit data 45 is accumulated in the memory 33.

In step S31, the descriptor setting section 41 writes packet-by-packet information (including "delay") of the transmit data 45 into each descriptor of the descriptor table 46 provided in the memory 33. In step S32, the device driver 43 notifies the descriptor controlling section 51 of the network card 35 of the numbers of the descriptors that have become usable, that is, the numbers of the descriptors set by the descriptor setting section 41 in the processing of step S31. The descriptor controlling section 51 stores the notified descriptor numbers in the built-in register.

In step S33, the descriptor acquiring section 52 acquires from the descriptor table 46 provided in the memory 33 all the descriptors corresponding to the numbers stored in the register of the descriptor controlling section 51.

In step S34, the stand-by-time controlling section 53 initializes the retained stand-by time D to zero.

In step S35, the descriptor acquiring section 52 acquires, from among the descriptors that have been acquired from the memory 33, one descriptor whose recording start address or the like has not been read. In step S36, the stand-by-time controlling section 53 waits on standby for the retained stand-by time D. The processing from step S37 onward is thus delayed by the stand-by time D. In the present case, since the stand-by time D=0, the processing immediately advances to step S37.

In step S37, the descriptor acquiring section 52 notifies the stand-by-time controlling section 53 of the delay time "delay" described in the descriptor read by the processing of step S35. The stand-by-time controlling section 53 substitutes the notified delay time "delay" for the retained stand-by time D.

In step S38, the descriptor acquiring section 52 notifies the DMA controlling section 54 of the recording start address "address" and the packet length "length" described in the descriptor that has been read by the processing of step S35. The DMA controlling section 54 notifies the memory controller 34 of the notified recording start address "address" and packet length "length" and requests execution of DMA. In response to this, the memory controller 34 transfers data of the packet length "length" from the notified recording start address "address" of the memory 33 to the transmitting section 55 by DMA. The transmitting section 55 transmits the DMA-transferred packet-by-packet transmit data 45 to the receiver 3 via the network 2.

In step S39, the descriptor acquiring section 52 makes a determination as to whether or not, from among the descriptors that have been acquired by the processing of step S33, there remain descriptors that have not been read by the processing of step S35. If it is determined that there remain descriptors that have not been read, the processing returns to step S35, and the subsequent processing is repeated. Note that in the processing of step S36 from the second time onward, since the delay time "delay" has been substituted for the stand-by time D in the processing of step S37 the previous time, the stand-by time is actually provided. Thus, the repetition interval for the processing from steps S35 through S39 including step S36 depends on the delay time "delay" described in the descriptor.

When it is determined in step S39 that there remain no descriptors that have not been read, the processing advances to step S40. In step S40, the DMA controlling section 54 notifies the interrupt controlling section 56 of the end of DMA. In response to this notification, the interrupt controlling section 56 notifies the interrupt processing section 44 of the end of DMA. In step S41, in response to this notification, the interrupt processing section 44 performs predetermined interrupt processing (processing of freeing up the space of the memory 3 occupied by the transmit data 45, or the like). Note that in actuality, the predetermined interrupt processing is performed when a program for realizing the interrupt processing section 44 is started in response to the notification from the interrupt controlling section 56. The foregoing completes the description of the second packet transmission processing by the transmitter 30.

According to the second packet transmission processing, the descriptor set in step S31 is acquired in step S33, and the stand-by time D is set on the basis of this descriptor (step S37). As a result, the repetition interval for the processing from steps S35 through S39, that is, the repetition interval for the processing of reading the acquired descriptor, transferring the packet by DMA on the basis of the read descriptor, and transmitting it via the network 2, corresponds to the delay time D for which the delay time "delay" described in the descriptor is substituted. The delay time D is controlled by the stand-by-time controlling section 53. Herein, the stand-by-time controlling section 53 is a circuit formed on the network card 35 as hardware. Accordingly, it is possible to control the repetition interval for the processing from the steps S35 through S39 with high precision. It is thus possible to achieve stable transmission rate for the transmit data to prevent the transmit data from being transmitted in a burst-like manner, thereby realizing so-called traffic shaping.

Note that since the descriptor is written on the packet-by-packet basis in either of the first and second packet transmission processing described above, the present invention can be also applied to cases where the packet length is not fixed, that is, cases where transmit data including variable-length packets are to be transmitted.

It should be understood by those skilled in the art that various modifications, combinations, sub-combinations and alterations may occur depending on design requirements and other factors insofar as they are within the scope of the appended claims or the equivalents thereof.

What is claimed is:

1. An information processor for reading data recorded in a memory on a packet-by-packet basis by DMA (Direct Memory Access), comprising:
   means for generating a descriptor, the descriptor including positional information that indicates a packet-by-packet recording position of the data in the memory and a delay time, the delay time corresponding to a difference between the capacity of the information processor to read the data from the memory and provide the data to a network card associated with the information processor and the capacity of the network card to transmit the data over a network;
   means for acquiring the generated descriptor and extracting the positional information and the delay time from the acquired descriptor;
   DMA means for reading, packet-by-packet, the data from the memory based on the extracted positional information; and
   means for delaying processing by at least one of the extracting means and the DMA means by the extracted delay time such that the information processor reads the data from the memory and provides the data to the network card in accordance with the transmission capacity of the network card.

2. The information processor according to claim 1, wherein:
   the means for generating a descriptor includes software; and
   the means for delaying includes hardware.

3. The information processor according to claim 1, wherein:
   when a plurality of the descriptors are generated, the means for acquiring and extracting acquires the plurality of the descriptors one by one.

4. The information processor according to claim 1, wherein:
   when a plurality of the descriptors are generated, the means for acquiring and extracting collectively acquires the plurality of the descriptors.

5. An information processing method for an information processor that reads data recorded in a memory on a packet-by-packet basis by DMA (Direct Memory Access), comprising the steps of:
   generating a descriptor including positional information that indicates a packet-by-packet recording position of the data in the memory and a delay time, the delay time corresponding to a difference between the capacity of the information processor to read the data from the memory and provide the data to a network card associated with the information processor and the capacity of the network card to transmit the data over a network;
   acquiring the generated descriptor;
   extracting the delay time from the acquired descriptor;
   extracting the positional information from the acquired descriptor, and
   reading, packet-by-packet, the data from the memory based on the extracted positional information; and
   delaying processing of at least one of the acquiring and the reading by the extracted delay time such that the information processor reads the data from the memory and provides the data to the network card in accordance with the transmission capacity of the network card.

6. An information processor for reading data recorded in a memory on a packet-by-packet basis by DMA (Direct Memory Access), comprising:
   a generating section that generates a descriptor, the descriptor including positional information indicating a packet-by-packet recording position of the data in the memory and a delay time, the delay time corresponding to a difference between the capacity of the information processor to read the data from the memory and provide the data to a network card associated with the information processor and the capacity of the network card to transmit the data over a network;
   an extracting section that acquires the generated descriptor and extracts the positional information and the delay time from the acquired descriptor;
   an DMA section that reads, packet-by-packet, the data from the memory based on the extracted positional information; and
   a delaying section that delays processing by at least one of the extracting section and the DMA section by the extracted delay time such that the information processor reads the data from the memory and provides the data to the network card in accordance with the transmission capacity of the network card.

* * * * *